United States Patent Office 3,410,012
Patented Nov. 12, 1968

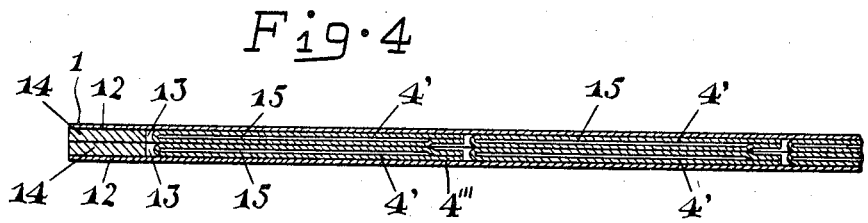
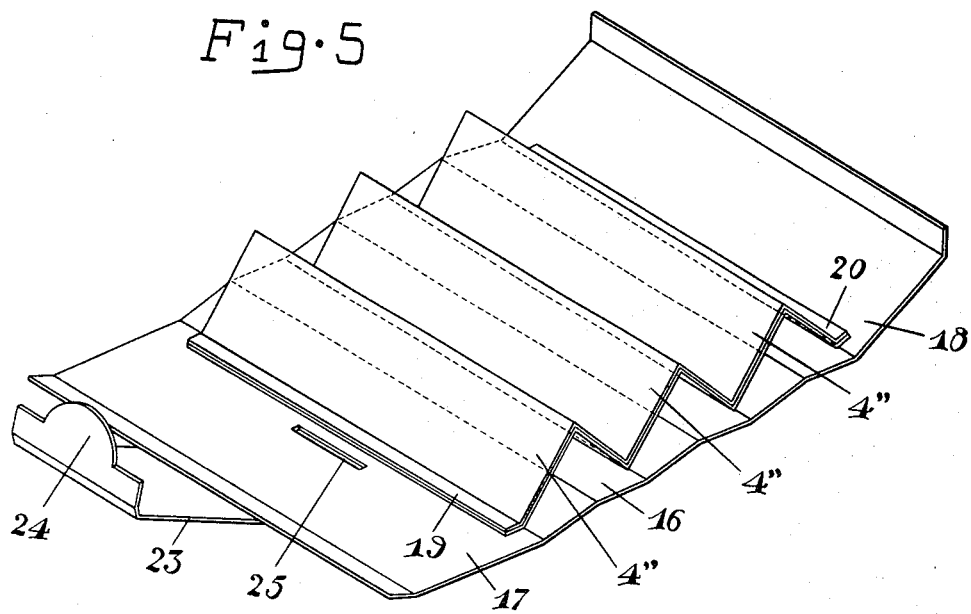
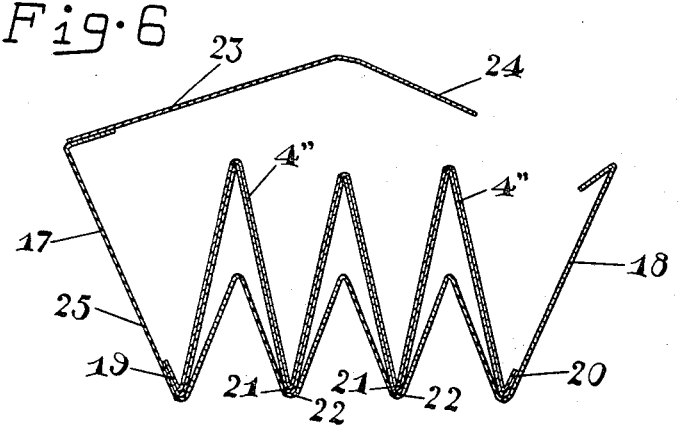

3,410,012
ALBUM BINDER FOR SLIDES OR NEGAFILMS
Chuichi Kumei, 31-banchi, Shinmei-cho, Nakano-ku, Tokyo, Japan, and Junji Eguchi, 32-banchi, 1-chome, Soshigaya, Setagaya-ku, Tokyo, Japan
Filed Mar. 18, 1966, Ser. No. 535,414
Claims priority, application Japan, Aug. 3, 1965, 40/46,915
6 Claims. (Cl. 40—106.1)

ABSTRACT OF THE DISCLOSURE

An album binder for slides or negafilms comprising two pivotally connected covers and a plurality of standing parts. The parts include means for receiving film for permitting light to pass therethrough, each extending continuously across a portion of both covers and having a transverse crease dividing each of the parts to permit transverse folding, which crease is located at the cover connection line. A reflecting ground sheet is provided to support the parts secured pivotally longitudinally and to reflect light through and onto the films when the binder is opened causing the standing parts to stand up slantingly from a collapsed closing position.

---

The present invention relates to an album binder for slides or negafilms.

If photographic pictures of a slide or a negafilm are to be seen clearly, it is necessary to take a slide or a negafilm by a finger one by one and hold it to the light, then the pictures can be observed by the incident light passing through the film.

It is one object of the present invention to provide an album binder, wherein there is no necessity for taking a slide or a negafilm up by a finger and holding it to the light, but by convenience and utility of observing all slides or negafilms can be observed at once by means of reflected light from a paper sheet only by opening an album binder which is a container of the films.

Upon opening the album binder, the film supporters stand all up slantily in an instant and the pictures can be seen clearly by film-passing light having been reflected on the under reflective paper sheet.

Reflection is increased by using reflection-increasing color or coating on the under sheet.

With these and other objects in view which will become apparent in the following detailed description, the present invention will be clearly understood in connection with the accompanying drawings, in which:

FIG. 4 is a cross section of the album binder with the cover closed of the embodiment disclosed in FIG. 3;

FIG. 5 is a perspective top view of the third embodiment of the album binder; and FIG. 6 is a cross section of the album binder having its cover half-closed of the embodiment disclosed in FIG. 5.

Figure 1:
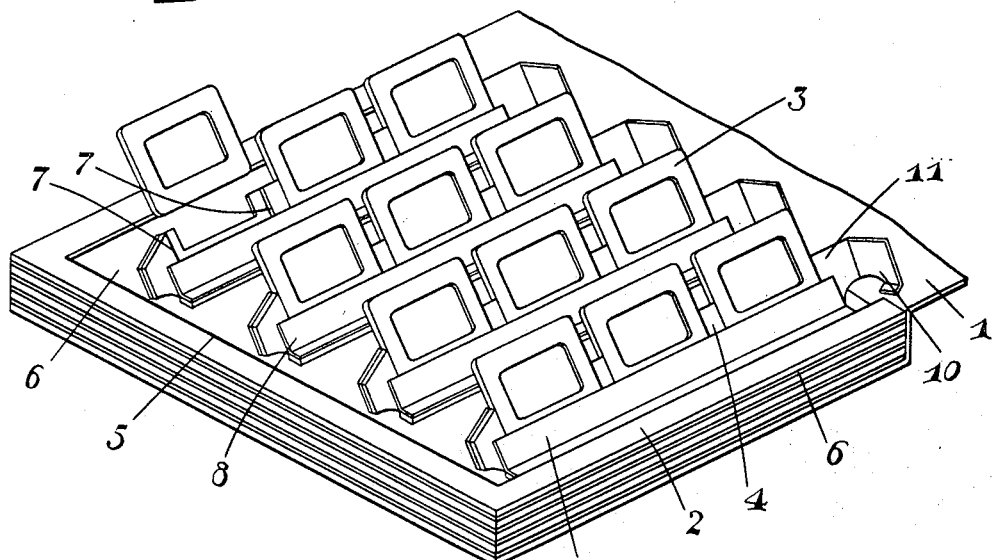
FIGURE 1 is a perspective top view of a front embodiment of the album binder.
Figure 2:
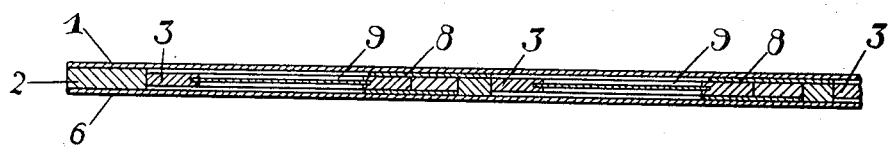
FIG. 2 is a cross section of the album binder with the cover closed on the embodiment shown in FIG. 1.

Referring now to the drawings, and in particular to FIGS. 1 and 2, disclosing a first embodiment of the present invention, the album binder comprises a cover 1, a ground sheet 2 fixing standing parts 4 for inserting film protecting frames 3 and a window hole 5 cut in the ground sheet 2 at several steps, under which ground sheet a reflective paper sheet is disposed on its surface.

The standing part 4 is capable of standing up, fixing the lower end of its longer side to the underside of the window hole 5, having several inserting parts 7 in horizontal direction and forming an inserting slit 9 by fixing a pressing part 8 on the standing part 4 in series.

Further, the standing part 4 has a connecting part 11 to bind a tractive part 10 and fixing the standing part 4 to the back of the cover 1.

When the cover 1 is opened, the standing part 4 stands up angularly as the tractive part 10 tracts the connecting part 11 and therefore the film protecting frame 3 inserted into the standing part 4 stands up to make a film-picture visible brightly by the light from the reflective sheet 6.

When cover 1 is closed, all slides or negafilms are contained in the window hole 5. The tractive part 10 of the standing part 4 is fixed to the back of a reflective sheet 6 (FIG. 2).

Figure 3:
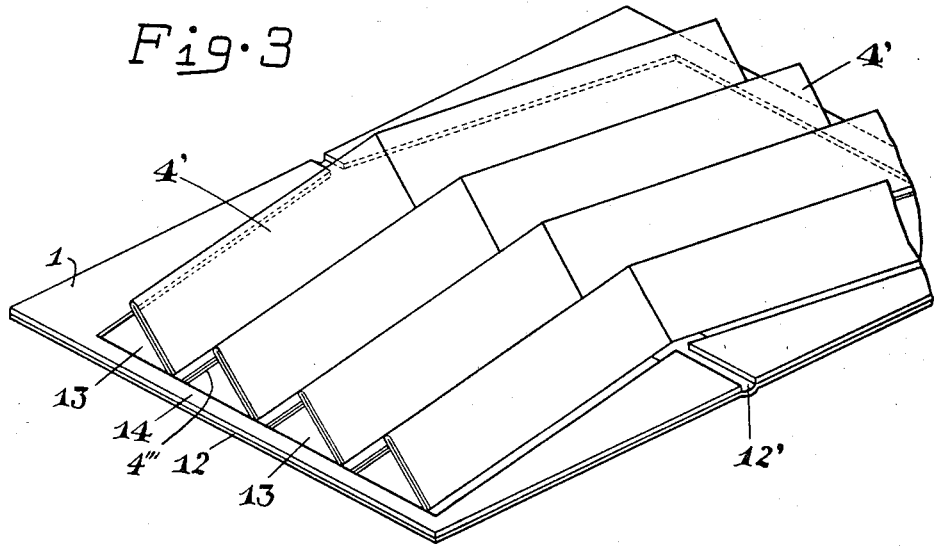
FIG. 3 is a perspective top view of a second embodiment of the album binder.

Referring now again to the drawings, and in particular to FIGS. 3 and 4, the album binder comprises a ground sheet 12 capable of being doubled at the center, whose inner side has frame board 14 with a window hole 13 having sloping parts down to two sides separated by crease cover connection line 12'.

When the ground sheet 12 is opened, the standing part 4' stands up angularly and when it is closed, the standing part 4' is disposed in each window hole 13. The inner surface of the ground sheet 12 is made reflective.

The second embodiment of the present invention is especially suitable for receiving successive films as the standing part 4' can be composed of long transparent synthetic resin boards, which can be doubled at their center and whose ends adhere to each other, to form a flat inserting slit 15.

The standing part 4' is pivotally longitudinally attached at its lowermost folded end 4''' by any conventional attaching means. The end 4''' slopes angularly relative to the cover connection line 12.

When the cover or the ground sheet 12 is opened, the standing part 4', supporting the slides or negafilms, stands up slantly and their pictures are visible clearly by the reflected light from the ground sheet.

When the cover is closed, the standing parts 4' are all contained therein, after falling down.

Referring now to FIGS. 5 and 6 of the drawings, the album binder comprises a cover 16 like a folding screen whose front and back parts 17 and 18 are attached by both end parts 19 and 20 of the inserting standing part 4'' made of transparent material able to be folded.

When the cover 16 is opened to a flat state, the standing part 4'' stands up like a saw-denticle and when it is closed, the standing part 4'' is folded as its lower doubling part 21 and is piled up to the lower doubling part 22 of the cover 16.

A stopper 23 (FIG. 6) has a tongue portion 24 at its front end, which tongue portion 24 can be inserted into a slot 25 for fastening purposes.

According to the present invention, upon opening the album binder, the standing parts stand up slantly and at the same time the light from said reflective ground sheet causes all inserted pictures in form of slides or negafilms to be visible clearly. Thus it is convenient to see any picture desirable to be seen. The album binder is able to contain the slides or negafilm and upon closing it is completely in a shut tight state, protecting the pictures and no possibility exists to soil, lose or injure, the material to be used can be paper, synthetic resin, etc.

While we have disclosed several embodiments of the present invention, it is to be understood that these embodiments are given by example only and not in a limiting sense, the scope of the present invention being determined by the objects and the claims.

We claim:
1. An album binder for slides or negafilms, comprising two pivotally connected covers,
a plurality of standing parts,
said parts including means for receiving and holding films for permitting light to pass therethrough,
each of said standing parts extending continuously across at least a portion of both of said covers and having transverse a crease dividing each of said standing parts to permit transverse folding,
said crease located at the cover connection line,
a reflection ground sheet supporting said standing parts, and
means for pivotally longitudinally attaching said parts to said sheet, so that the opening of the binder causes said standing parts to stand up slantingly to render said films visible by the reflecting light from said ground sheet and the closing of said binder causes said standing parts to collapse and to be contained in said binder.
2. The album binder, as set forth in claim 1, wherein each of said standing parts extend continuously across substantially the entire width of both of said covers.
3. The album binder, as set forth in claim 1, wherein said standing parts are transparent and have a substantially U-shaped folded configuration defining a slot therebetween constituting said means for receiving and holding films for permitting light to pass therethrough.
4. The album binder, as set forth in claim 1, wherein said covers include, two frame boards each forming a window hole therein, and spaced from each other,
said reflecting ground sheet secured to both of said two frame boards at one side of said frame boards covering said window holes at said one side, and
said parts being supported by said ground sheet in said window holes.
5. The album binder, as set forth in claim 1, wherein said each of said standing parts extends angularly relative said cover connection line along said means for pivotally longitudinally attaching said parts to said sheet.
6. The album binder, as set forth in claim 1, wherein said means for pivotally longitudinally attaching said parts to said sheet constitutes a folded lowermost end of said parts which is secured to said sheet.

References Cited
UNITED STATES PATENTS

| | | |
|---|---|---|
| 1,214,213 | 1/1917 | Parsons. |
| 1,828,808 | 10/1931 | Kimble _____ 40—102 |
| 2,249,265 | 7/1941 | Bauder _____ 206—73 X |

FOREIGN PATENTS

| | | |
|---|---|---|
| 1,010,965 | 4/1952 | France. |
| 1,335,137 | 7/1963 | France. |

EUGENE R. CAPOZIO, *Primary Examiner.*

R. CARTER, *Assistant Examiner.*